United States Patent

[11] 3,614,558

[72] Inventors Claude Jan Principe Frederic Le Can; Walter Steinmaier, both of Mollenhutseweg, Nijmegen, Netherlands

[21] Appl. No. 487,748
[22] Filed Sept. 16, 1965
[45] Patented Oct. 19, 1971
[73] Assignee U. S. Philips Corporation New York, N.Y.
[32] Priority Sept. 23, 1964
[33] Netherlands
[31] 6411057

[54] SEMICONDUCTOR DEVICES WITH MORE THAN ONE SEMICONDUCTOR CIRCUIT ELEMENT IN ONE BODY
15 Claims, 12 Drawing Figs.

[52] U.S. Cl. .......... 317/235 R, 317/101 A, 317/235 F, 148/175
[51] Int. Cl. .......... H01l 19/00
[50] Field of Search .......... 317/234 (5), 234 (8), 235 (22), 235 (40), 235 (48.1), 101 A, 235 (22.11); 307/88.5 (21.3); 29/155.5 I

[56] References Cited

UNITED STATES PATENTS

| | | | |
|---|---|---|---|
| 3,323,071 | 5/1967 | Mitchell | 317/235 |
| 3,236,701 | 2/1966 | Ling | 317/235 (22) |
| 3,250,966 | 5/1966 | Rose | 317/234 (8) |
| 3,368,113 | 2/1968 | Shaunfield | 317/235 (22) |
| 3,381,182 | 4/1968 | Thornton | 317/235 (22) |

FOREIGN PATENTS

| | | | |
|---|---|---|---|
| 948,238 | 1/1964 | Great Britain | 317/235 (21) |

OTHER REFERENCES

Electronics Review, Microelectronics, Vol. 37, No. 17, pg. 23, June 1, 1964, 317/235/22

Electronic Design, " Silicon Integrated Circuits Steal the Show" Vol. 12, No. 8, pp. 12, 13, 14, Apr. 1964, 317/235/22

*Primary Examiner*—Jerry D. Craig
*Attorney*—Frank R. Trifari

ABSTRACT: A solid semiconductor circuit employing a buried metal layer to reduce the series resistance of a semiconductor zone of one of the circuit elements.

Figure 1:
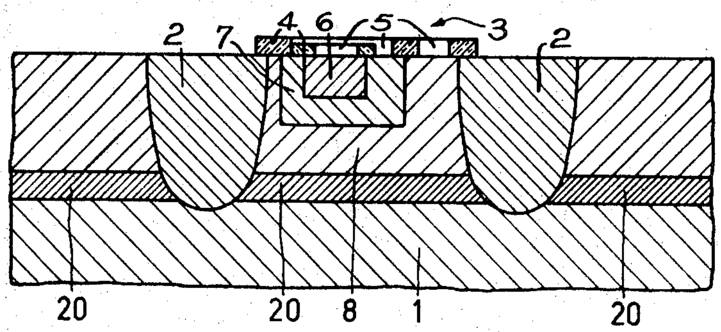

INVENTORS
CLAUDE J.P.F. LE CAN
WALTER STEINWAIER
BY
[signature]
AGENT

INVENTORS
CLAUDE J.P.F. LE CAN
WALTER STEINWAIER
BY
Frank R. Trifari
AGENT

INVENTORS
CLAUDE J.P.F. LE CAN
WALTER STEINWAIER
BY
[signature]
AGENT

INVENTORS
CLAUDE J.P.F. LE CAM
WALTER STEINWAIER
BY
Frank R. Trifari
AGENT

SEMICONDUCTOR DEVICES WITH MORE THAN ONE SEMICONDUCTOR CIRCUIT ELEMENT IN ONE BODY

The invention relates to a semiconductor device with two or more semiconductor circuit elements in one body and to a method of manufacturing such a device. Such devices are often termed "solid circuits."

An object of the invention is a solid circuit with an isolated circuit element containing a buried layer of improved conductivity.

In the drawing, FIGS. 1–4 illustrate the prior art constructions, and FIGS. 5–12 show embodiments of the invention.

Known types of such devices will be described with reference to FIGS. 1 to 4 of the accompanying drawing, which figures show vertical cross sections of circuit element in such known types of devices.

The semiconductor device partly shown in FIG. 1 is of a type in which a number of circuit elements are formed on one side of a monocrystalline semiconductor body and adjoin the material of the substrate with PN junctions. In FIG. 1 only a transistor is shown of these circuit elements. The device shown comprises, for example, a substrate 1 of monocrystalline P-type silicon, on which a number of circuit elements are formed on one side, of which the Figures shown an NPN-silicon transistor 3. The circuit elements are separated from one another by P-conductive strips 2. The NPN-transistor 3 is coated with oxide layers 4 in which windows 5 are recessed for providing contacts with the emitter 6, the base 7 and the collector 8. In the interest of clarity of the figures the vertical dimensions are exaggeratedly large with respect to the horizontal dimensions. Each circuit element comprises an N-conducting zone which adjoins the P-conducting substrate and the P-conducting strips. The insulation between the circuit elements mutually and between the circuit elements and the substrate may be obtained by ensuring that the substrate is biased with respect to the said N-conducting zones in the cutoff direction.

Figure 2:
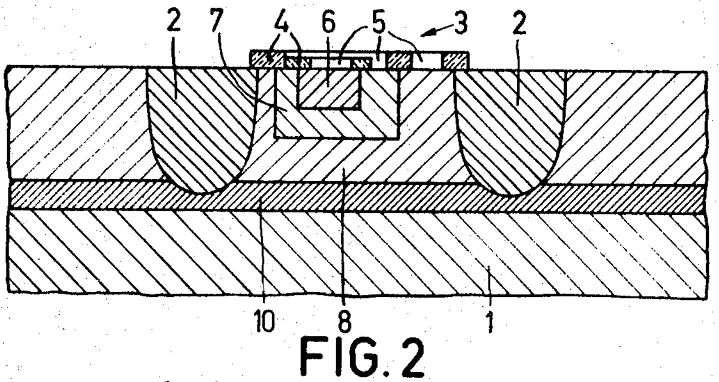
Figures 3, 4:
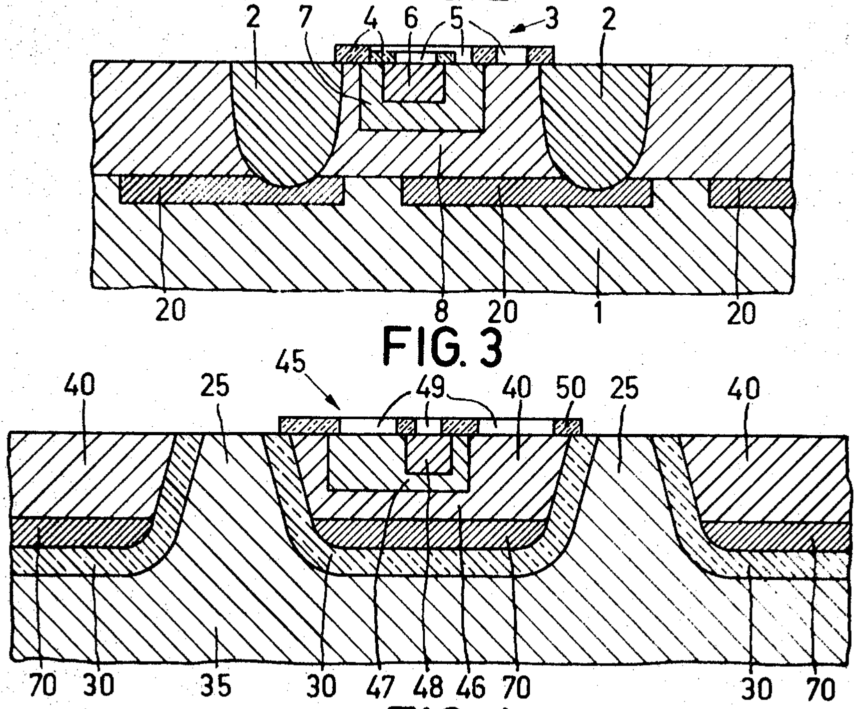

The NPN-transistor as shown in FIG. 1 comprises a base and emitter region 7 and 6 respectively obtained by diffusion. For locally varying the conductivity type when diffusing an acceptor to form the base region 7, the original N-type region, the remainder of which forms the collector, may not be doped too high. In addition, the collector zone must be doped low in the proximity of the junction to the base in order that the base-collector breakdown voltage be high. The collector region 8 comprises an electric connection at the area where it reaches the surface. However, the part of the collector region 8 below the base region 7 is very thin and since the region 8 consists of comparatively high-ohmic material, the resistance between the collector contact and those parts of the region 8 which are far remote from the said contact becomes rather high which, as is known, is less desirable for a transistor. Also in a circuit element operating as a diode high resistance between the lowermost zone and the contact for that zone at the surface may give a less desirable increased resistance in the forward direction. It has therefore been proposed already to provide such lowermost zones, at the area where they adjoin the substrate, with additional zones of semiconductor material of the same conductivity type, but with increased specific conductivity. FIG. 1 shows such zones 20 which in this case are of the N-type. Such zones 20 can be obtained by forming on the P-conducting substrate a high-doped zone 10 (see FIG. 2) by diffusion of a donor or epitaxially and then providing the low-doped N-conducting material epitaxially on the zone 10. A difficulty is, however, that during the formation of the P-conducting separating strips 2 by diffusion of an acceptor, the donor material of the zone 10 also diffuses so that the strips 2 may not contact the P-conducting substrate 1 through the layer 10 and thus the circuit elements may not be insulated from one another. It has therefor been proposed already to provide the high-doped N-conducting layer 10, hereinafter termed $n^+$ layer, only at the desired places, for example, by diffusion with the use of a local oxide mask, so that a few separated $n^+$ zones 20 are formed (see FIG. 3). In this case there is the difficulty that after the epitaxial provision of the N-type material of lower specific conductivity, the locations of the said zones 20 are no longer visible. When the masking, which is used for accurately localizing the P-conductive strips 2, is not exactly adapted to the masking used for localizing the zones 20, but is displaced, for example, somewhat with respect to the latter, the same drawback may occur as is described with reference to FIG. 2, namely that the strips 2 do not contact the substrate, as is shown in FIG. 3. In addition the possibility exists that such a high-doped zone 20 does no longer extend below the zone 7 of opposite conductivity type located above it, as a result of which the favorable influence of the zone 20 is decreased.

In a later proposal of a quite different type of semiconductor device with a number of circuit elements in one body, part of which device is shown in FIG. 4, a number of insulated semiconductor circuit elements sunk in a substrate material and separated therefrom by layers 30 of insulating material, are arranged on one side of the substrate consisting of polycrystalline silicon 35. These semiconductor circuit elements are built up from parts 40 consisting of monocrystalline silicon. Of these circuit elements FIG. 4 only shows a transistor 45 in greater detail. This transistor consists of an N-conducting collector zone 46, a P-conducting base zone 47 and an N-conducting emitter zone 48. An oxide film 50 with windows 49 is located at the surface of the body for providing contacts (not shown in FIG. 4) with the various zones of the transistor. As a result of the presence of the insulating layers 30 the capacitive coupling between the various circuit elements on the zone side and the substrate material on the other side is much smaller than in the device described with reference to FIG. 1 in which the circuit elements are separated from the substrate by a PN junction. As was the case in the device of the above-described known type built up on a substrate of monocrystalline P-type silicon, a zone 70 of N-type silicon of low resistivity is provided on the lower side of the transistor and directly adjoins the insulating layer 30 for decreasing the collector resistance.

Devices of the type described with reference to FIG. 4 may be manufactured as follows. A monocrystalline body consisting of silicon of a given conductivity type is provided on the lower side with a layer of semiconductor material 70 of the same conductivity type with increased specific conductivity. This can be done in a simple manner, for example, by providing epitaxially or by a conventional diffusion process. Grooves 25 are then provided in the lower side and a silicon oxide layer 30 is formed by oxidation, said layer covering the surface on the lower side and the walls of the grooves 25. Then silicon 35 is deposited on the lower side by decomposition of a halogen silane and the crystal is ground away from the upper side to such an extent that the material which fills the grooves 25 becomes located at the surface on the upper side of the resulting body. The upper side now comprises insulated monocrystalline parts 40 of the original semiconductor crystal. By conventional diffusion technics with the use of oxide makes the various semiconductor circuit elements may be formed from the separate parts 40 of the original crystal. So by diffusion of boron and phosphorus the base 47 and the emitter 48 respectively of the transistor 45 may be formed.

Since the grooves 25 determine the separation and location both of the semiconductor circuit elements 40 and of the layers 70, it is clear that the difficulties described with reference to FIGS. 2 and 3 cannot occur in this case.

An important advantage of a device of the type shown in FIG. 4 with respect to a device of the type shown in FIG. 1 is, as already described, the lower capacitive coupling between the circuit elements and the substrate. In addition it has been possible in the above-described manner to provide the lower side of one or more of the circuit elements with a layer of semiconductor material with increased doping in a better reproducible manner. One of the objects of the invention is to provide a method of further improving the conductivity properties of the readily conducting layer in devices of the type last described. In fact, in the manufacture of the type of semiconductor device shown in FIG. 1 the material for the circuit elements is provided epitaxially on the monocrystalline substrate 1 which involves that also the layers 20 of increased specific conductivity used between the circuit element and the substrate must consist of semiconductor material with monocrystalline construction equal to that of the substrate. Such a choice of the material of such a layer with increased conductivity was later adapted in devices of the type shown in FIG. 4 from the above-mentioned older types of semiconductor devices which were discussed with reference to FIG. 1. The invention is based on the idea that in the types as shown in FIG. 4 the choice of the material of the readily conducting layer along the lower side of the circuit elements need not be restricted to high-doped semiconductor material since in the manufacture of the device said layer need not serve as a substrate for providing monocrystalline semiconductor material which is essential for the operation of the circuit elements. The invention is further based on the idea that the specific conductivity of the semiconductor materials, also in case of high-doping with acceptors or donors, is never very high. A semiconductor device consisting of a substrate and a number of semiconductor elements sunk in the surface of the substrate and separated from one another by the material of the substrate which elements, at least on the side where they are surrounded by the material of the substrate, are bounded by insulation material, one or more of the said circuit elements comprising a semiconductor zone of a given conductivity type extending over the whole lower side and locally appearing on the surface, is characterized according to the invention in that the lower side of one or more of the said sunk circuit elements is provided with a metallically conducting metal layer which is connected in an electrically conducting manner to the semiconductor material on the lower side of such a circuit element. The resistivities of metallically conducting metals are much smaller, in general a few orders of magnitude smaller, than those of highly-doped semiconductor materials. The method according to the invention relates to the manufacture of the said semiconductor devices and is characterized in that on one side of a monocrystalline semiconductor body a metallically conducting metal layer is provided on at least part of the surface of the semiconductor body, after which grooves are provided in the said metal layer and to some depth in the adjoining semiconductors material, in which the metal layer is divided into separate islands, that the surface of the body on the side where the metal layer is provided and the walls of the grooves are coated with insulating material and the material of the substrate is provided on it, after which from the oppositely located side of the monocrystalline semiconductor body, the semiconductor material is removed at least to the bottom of the grooves so that the semiconductor crystal is divided into a number of separate monocrystalline parts after which the circuit elements are formed from the monocrystalline parts.

In order that the invention may readily be carried into effect it will now be described in greater detail by way of example, with reference to FIGS. 5–12 which show stages of the manufacture of semiconductor devices in vertical cross sections.

Figure 5:
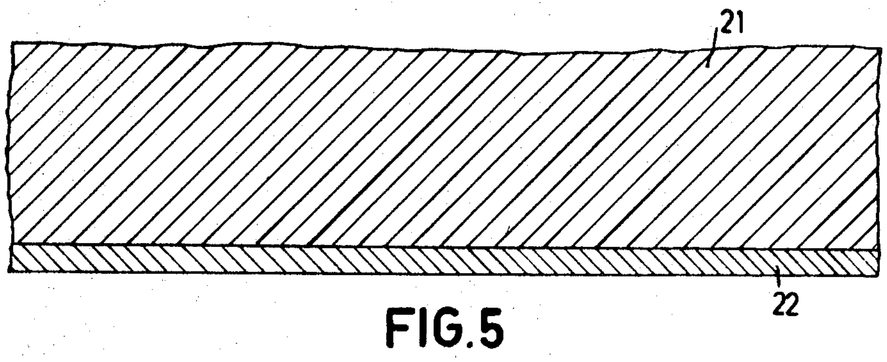
Figure 6:
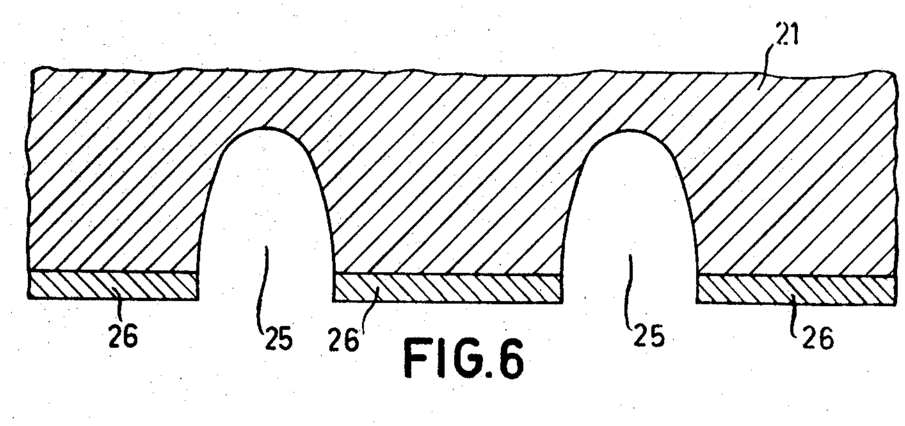

A rectangular semiconductor body 21, for example, of N-type silicon with a resistivity of 0.3 Ω cm., is coated on the lower side with a metallically conducting metal layer 22 (see FIG. 5). The sheet resistance of such a metal layer, i.e. the resistance of a square of 1×1 cm. of such a layer measured between two oppositely located sides, is in the order of magnitude of $10^{+2}$ Ω or less in the case of a layer thickness of 1$\mu$ and is in the order of magnitude of $10^{+1}$ Ω or less in the case of a layer thickness of 0.1 $\mu$, while, for example, an N-conducting layer obtained by diffusion of phosphorus into silicon with a thickness of 1$\mu$ has a sheet resistance in the order of magnitude of 1 Ω or more.

Naturally, the end in view will have to be taken into account in general in the choice of the metal for the layer, namely a resistance in the current path which is as small as possible from all the parts of the lowermost semiconductor electrode layer of a circuit element to the connection contact on the upper side of the circuit element without the electric properties of the circuit elements being unduly influenced by the presence of the metal during the manufacture. After providing the metal layer certain impurities must be diffused into the semiconductor material to obtain zones of different conductivity types and/or conductivities. During the thermal treatments required for that purpose the metal may not unduly disturb the obtaining of the desired properties of the PN junctions to be manufactured by too deep a penetration into the semiconductor material. In principle this penetration is possible by diffusion and/or formation of an alloying melt. Poorly diffusing transition metals of high melting point, for example, platinum, tantalum, tungsten, and molybdenum may be chosen for that reason, preferably those high-melting point transition metals which, moreover, have a coefficient of expansion which is approximately of the same value as that of the semiconductor material. In that respect preferably tungsten and molybdenum may be chosen since the coefficient of expansion of the said metals do not differ too much from those germanium, silicon and many other semiconductor materials. The use of molybdenum has the further advantage that it is believed to form a compound, molybdenum silicide, with the underlying silicon, which compound also appears to exhibit metallic conduction properties.

In principle it is possible to choose a metal which after its provision melts at the temperature to be used afterwards during the manufacture provided that the depth of the melting front and the metal impurities diffusing from this front into the semiconductor material do not unduly influence the junctions to be manufactured in the circuit element. For that reason, for example, lead or tim in contact with silicon and lead in contact with germanium may be chosen. In principle lead and tin are neutral with respect to the semiconductor properties of germanium and silicon. The depth of penetration of molten lead into germanium and molten lead, tin or lead-tin alloys into silicon is comparatively small. In addition, donors or acceptors may be added, if required, for forming a contact layer with N- and P-type semiconductor material respectively, preferably those with low diffusion coefficients. Also a thin aluminum layer in combination with a lowermost semiconductor zone of P-type germanium and a thin layer of indium in combination with a lowermost semiconductor zone of P-type silicon may be chosen. These acceptors have small diffusion coefficients in the semiconductors in question. When the above meltable materials are used a melt can be formed during the later thermal treatments. This melt is trapped between the lower side of the monocrystalline semiconductor and the insulating material which bounds the circuit element while the free surface on the upper side of the monocrystalline semiconductor material may freely be used for diffusion treatments to form one or more zones of the desired conductivity type and/or conductivity.

Further it is self-evident that the transition between metal and semiconductor preferably should have a sufficient low resistance so that indeed the current path from the lowermost semiconductor electrode layer to the contact for that electrode extends through the metal layer. When, for example, a metal which may be considered as suitable does not form as such a sufficiently low transition resistance with the semiconductor material, other metals may be chosen in principle or the possibility exists to decrease the contact resistance between metallically conducting metal and semiconductor by suitable measures, for example, pretreatment of the semiconductor, for example, surface roughening or irradiation with rapid electrons or $\alpha$-particles, or additional measures during the provision of the metal layer, for example, the addition of a suitable doping material during evaporating or depositing the metal in a different manner, for example, by thermal decomposition of volatile compounds of the metal. Instead of one metal also two or more metals may be used in the metal layer, both in the form of an alloy and in the form of layers of materials with different compositions.

It is self-evident that adjoining the metal layer 22 a highly-doped semiconductor zone may be used, the said zone being provided previously or being formed by interaction of the material of the metal layer and the semiconductor material. It is true, such a layer is not anymore required for decreasing the horizontal resistance but it may effect a decrease of the contact resistance between the metal and the semiconductor material. For the ultimate division into circuit elements of a given pattern, grooves 25 are provided in the lower side of the semiconductor body where the metal layer is provided, for example, with a width of approximately 30$\mu$ and a depth of approximately 20$\mu$. These grooves may be provided, for example, by etching or mechanically, if required followed by etching (see FIG. 6). After this treatment separate metal layers 26 are located between the grooves.

Figure 7:
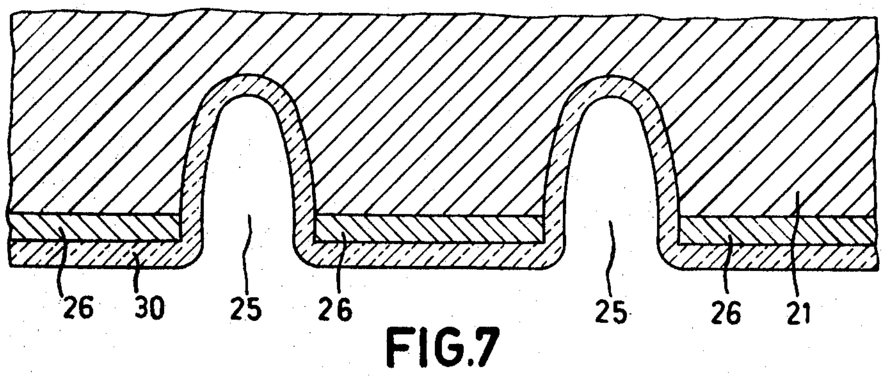
Figure 8:
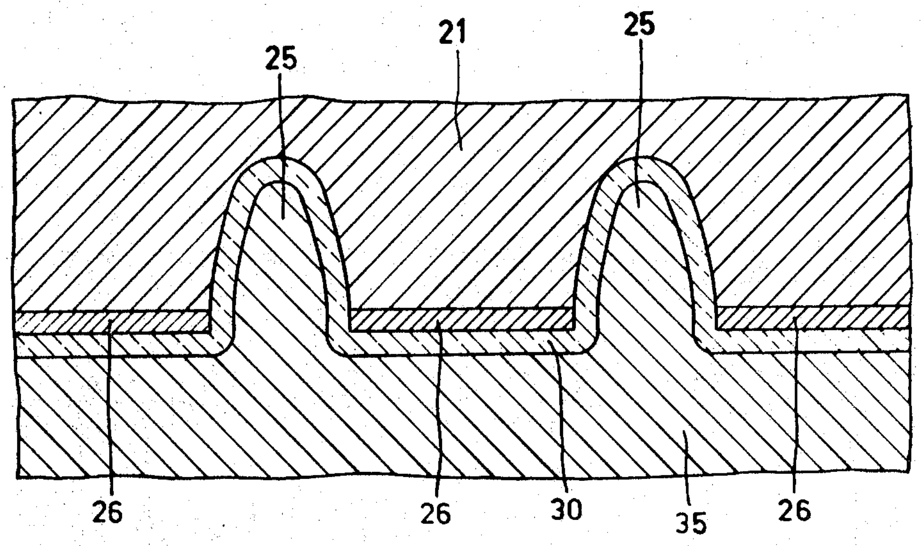

The whole lower side of the surface of the body and the walls of the grooves are then provided with a layer 30 of insulating material (See FIG. 7). The insulating layer 30 preferably consists of a thermally stable material, preferably a refractory material, for example, a refractory oxide, for example, silicon oxide or aluminum oxide. The layer may be provided in a manner known per se. In the choice of the material of the metal layers the provision of the said insulating layer may be taken into account also. The actual substrate material 35 is then provided on the lower side (see FIG. 8). This substrate material may preferably withstand the influence of temperature also and preferably has a coefficient of expansion adapted to the semiconductor material 21. The substrate material preferably consists of the same semiconductor material as the semiconductor material of the body 21.

As regards the substrate material and the insulating material it is noted that the invention is not restricted to the known use of a substrate of polycrystalline semiconductor material and layers of insulating material consisting of silicon oxide. The principle, the substrate may also consist of a different material, for example, a semiconductor material other than the material of the circuit elements, a metal or an alloy, or an insulating material. The insulating material may consist of a material other than silicon oxide and need not be provided in the form of a layer. The whole substrate, the material adjoining the circuit elements included, may consist, for example, of an insulating material. Alternatively it is possible that at least part of the insulating material adjoining the semiconductor circuit elements consists of a compound of the metal used on the lower side of such a circuit element, for example, and oxide thereof, obtained by preceding superficial oxidation of the metal layer 22 or layers 26. The substrate material may be provided in a thickness of 100$\mu$ or more. It must fill the grooves and further have a sufficient thickness to form the support for the circuit elements.

Figure 9:
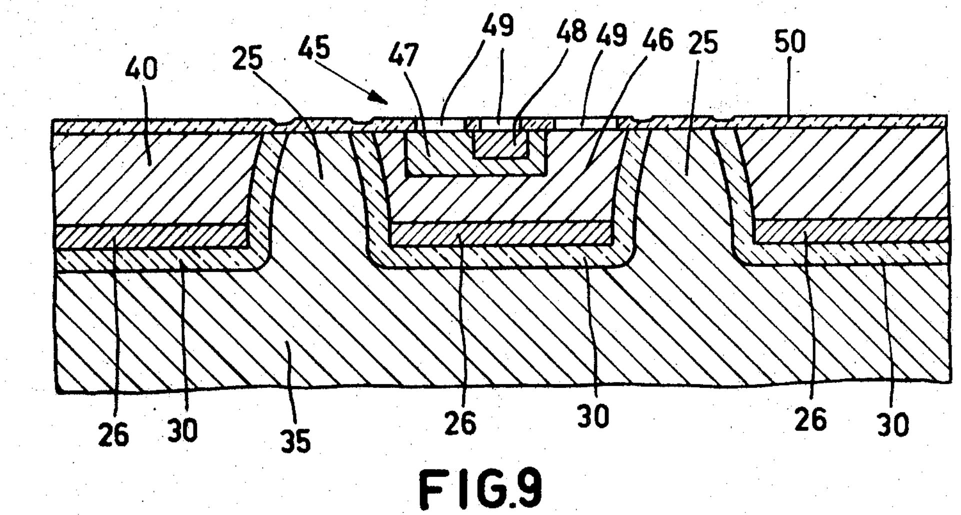
Figure 10:
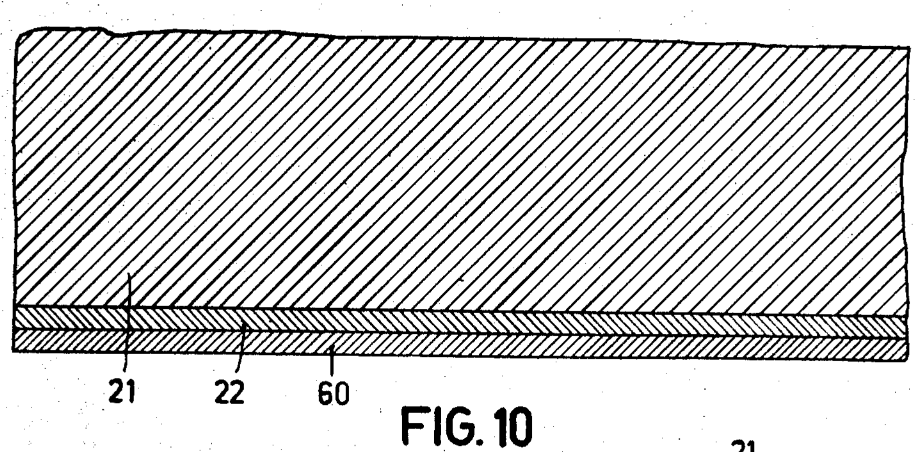

Then, from the upper side, the monocrystal 21 is ground away to such an extent that the substrate material which fills the grooves becomes located on the surface and the monocrystalline silicon is divided into regions 40 which are insulated from one another. The thickness of these regions may be rather small, for example, in the order of 10$\mu$ (see FIG. 9). The regions 40 consist of monocrystalline semiconductor material and each serve for the construction of a circuit element. The substrate material 35 is sufficiently thick to give the assembly, after the grinding operation, a sufficient rigidity and now forms the substrate of the circuit elements of monocrystalline semiconductor material, but the said substrate itself need not fulfill an electrical function and is insulated from the semiconductor circuit element by the layer 30. FIG. 9 shows, by way of example, a transistor 45 as a circuit element. The circuit element comprises, for example, a collector region 46 of N-conducting monocrystalline material of the original semiconductor monocrystal. The base region 47 consists of P-type material and the emitter region 48 of N-type material. When on the upper side an oxide film 50 is used on the free surface, windows 49 are recessed therein for providing ohmic contacts with emitter base and collector (not shown). FIG. 9 shows that the lower side of the whole collector region 46 is in contact with the metal layer 26 on the lower side of the transistor 45.

Figure 11:
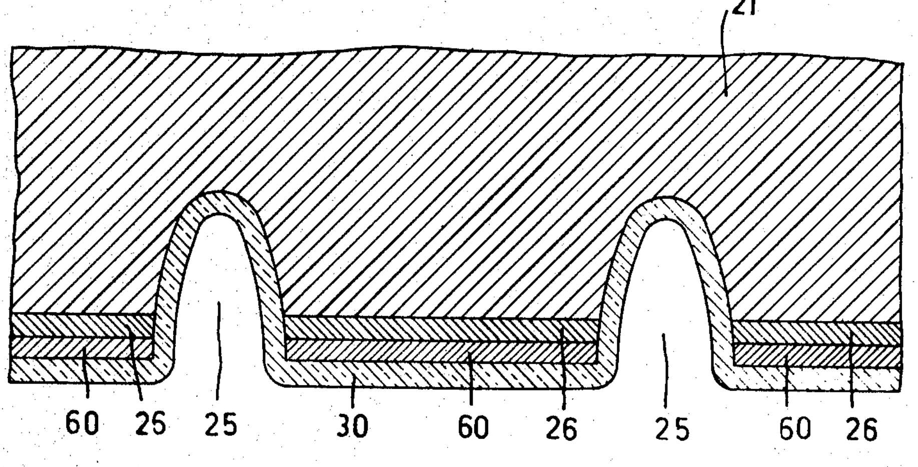
Figure 12:
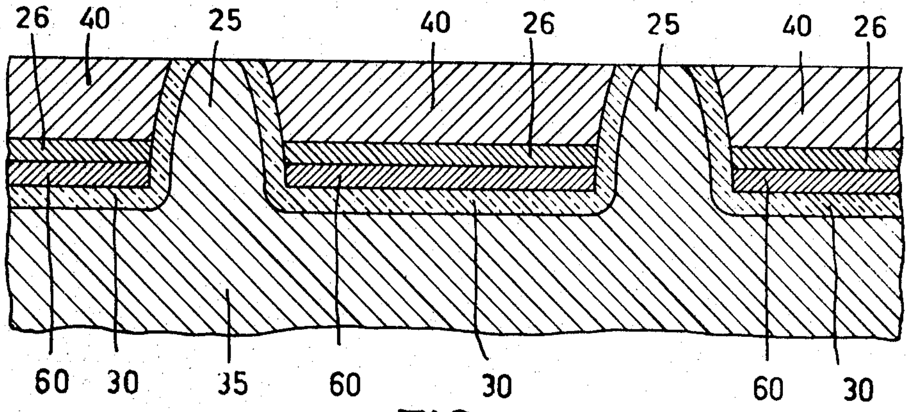

The possibility exists that during the provision of the layer of insulating material 30 (see FIG. 7) the metal layers 26 are attacked, for example, oxidized. In order to avoid such an attack, a layer 60, for example, of semiconductor material (see FIG. 10), may be provided on the said metal layer after providing the metal layer 22 (see FIG. 5). When the grooves 25 and the insulating layer 30 are then provided, for example, when using silicon as a semiconductor material by superficial oxidation, the metal may be attacked, in the worst case, along the wall of the grooves, which is permissible. FIG. 11 shows the configuration after providing the insulating layer 30, which configuration with the exception of the semiconductor layer 60, corresponds to the configuration shown in FIG. 7. By providing the substrate material on the lower side of the body and performing the grinding operation on the upper side in accordance with the operations described with reference to FIGS. 8 and 9 respectively, the configuration shown in FIG. 12 is obtained. The individual monocrystalline semiconductor regions 40 can further be treated in a manner known per se for obtaining the various desired circuit elements. The semiconductor layer 60 immediately adjoining the lower side of the metal layers 26 and interrupted by providing the grooves 25 will be polycrystalline in general, it is true, but this layer cannot adversely influence the operation of the circuit element to be formed in the monocrystalline silicon.

Naturally, within the scope of this invention many variations to the devices described here by way of example and the manufacture thereof are possible. For example, before providing the grooves the metal layer on the lower surface of the monocrystalline semiconductor body may be restricted to those parts of the surface where the said metal layer is desired. In addition it is possible, before providing the metal layer, to provide local zones with a conductivity type opposite to the remaining part of the monocrystalline semiconductor body by localized diffusion treatments in the lower surface. Alternatively, instead of one metallic layer of only one metallically conducting material, juxtaposed metal layers of different metallically conducting materials may be provided. For example, in the case that the lower surface comprises parts with different conductivity types, a different type of metal may be provided on P-type material than on N-type material. Alternatively, for example, by diffusion treatments, highly-doped zones adjoining the metal may be obtained before providing the metal layer. As already stated above, due to the presence of the metal layer, such zones are not necessary for a satisfactory horizontal conductivity of the lowermost semiconductor zone of a circuit element but they often are desired for obtaining a satisfactory ohmic contact with the metal layer.

The invention is further not restricted to silicon but also comprises the use of other semiconductor materials, for example, germanium and compounds of the type $A^{III}B^{V}$ between elements of the third and fifth main groups of the periodic system of the elements.

What is claimed is:

1. A semiconductor device comprising a substrate, plural semiconductor circuit elements spaced from one another within said substrate, a layer of insulating material in the substrate surrounding at least one of said circuit elements, a semiconductive zone in said one circuit element and accessible at the surface and containing active dopants, and a metal layer exhibiting a sheet resistance of $10^{1}$ohms/cm.$^{2}$ or less buried in said circuit element and in contact with the insulating layer and electrically contacting the said semiconductive zone at the region thereof remote from the surface, said metal possessing a relatively low diffusion rate into said semiconductor compared with that of the active dopants and forming a low transition contact resistance to the said semiconductive zone.

2. A device as set forth in claim 1 wherein the metal layer is selected from the group consisting of platinum, tantalum, tungsten, and molybdenum.

3. A device as set forth in claim 1 wherein a layer of semiconductive material is provided on the insulating layer, and the metal layer is provided on the semiconductive layer.

4. A device as set forth in claim 1 and including connections over the surface between zones of the plural circuit elements to form an integrated circuit.

5. A device as set forth in claim 1 and including a connection to the surface of said semiconductive zone, said buried layer reducing the resistance between the said connection and the interior portions of said zone.

6. A device as set forth in claim 1 wherein the circuit elements are built up on monocrystalline material, and the substrate is of polycrystalline material.

7. A device as set forth in claim 1 wherein the metal layer is constituted of a high melting point transition metal.

8. A device as set forth in claim 7 wherein the metal of the metal layer has an expansion coefficient which substantially matches that of the semiconductor.

9. A semiconductor integrated circuit structure comprising: a support member of coherent polycrystalline semiconductor material having a plurality of depressions in one surface thereof; a layer of insulating material lining each of said plurality of depressions; a layer of metal disposed on said layer of insulating material at the bottom of at least one of said depressions; a plurality of separate bodies of device quality semiconductor material, one of said bodies disposed in each of said depressions, all of said bodies having a surface lying in a common plane; an electronic element disposed within each of said separate bodies, at least one electronic element being a junction transistor in said body disposed within said depression having said layer of metal therein to provide reduced transistor saturation resistance while maintaining substantially complete electrical isolation between said separate bodies.

10. The subject matter of claim 9 wherein: said layer of metal consists essentially of at least one member of the group consisting of molybdenum, tungsten, platinum, and tantalum, and alloys thereof.

11. A dielectrically isolated structure comprising a body of polycrystalline material having a substantially planar surface, at least two discrete spaced-apart bodies of monocrystalline semiconductive material surrounded by an isolating oxide layer on their side and bottom surfaces and embedded in the polycrystalline material with their upper surfaces at the surface of the polycrystalline material and with the isolating oxide layers separating said monocrystalline bodies from each other and from the polycrystalline material, electronic devices formed in said bodies of monocrystalline material with electrical contacts to said devices on the surface of the monocrystalline bodies, said bodies of monocrystalline material having thin regions of high free-carrier concentration immediately adjacent at least portions of the isolating oxide layers on their side and bottom surfaces, said thin regions exhibiting a sheet resistance of $10^{11}$ ohms/$cm.^2$ or less and being otherwise unconnected by any low resistance path to the electrical contacts to the electronic devices formed in the monocrystalline bodies, whereby sufficient carriers are provided in said regions to counterbalance the induced effect of any charge present in the polycrystalline body and thereby prevent any substantial change in the carrier distribution in the bulk of the monocrystalline semiconductor material.

12. The structure as in claim 1 in which the upper surface of the polycrystalline material and discrete bodies embedded therein is at least partially covered with a layer of oxide.

13. The structure as in claim 12 in which the polycrystalline material is silicon and the monocrystalline material is silicon.

14. The structure as in claim 13 in which the thin regions are of molybdenum disilicide.

15. The dielectrically isolated structure of claim 12 in which the thin regions of high free-carrier concentration are adjacent only the isolating oxide layer on the bottom surfaces of the monocrystalline bodies.

PO-1050
(5/69)

UNITED STATES PATENT OFFICE
CERTIFICATE OF CORRECTION

Patent No. 3614558 Dated October 19, 1971

Inventor(s) CLAUDE JAN PRINCIPE FREDERIC LE CAN

It is certified that error appears in the above-identified patent and that said Letters Patent are hereby corrected as shown below:

Col. 3, line 63, "$10^{+2}$" should read -- $10^{-2}$ --;

line 64, "$10^{+1}$" should read -- $10^{-1}$ --;

Col. 5, line 45, "and" should read -- an --;

Col. 6, line 63, "$10^{1}$ohms" should read -- $10^{-1}$ohms --;

Col. 8, line 17, "$10^{11}$" should read -- $10^{-1}$ --.

Signed and sealed this 25th day of April 1972.

(SEAL)
Attest:

EDWARD M.FLETCHER,JR.
Attesting Officer

ROBERT GOTTSCHALK
Commissioner of Patents